Nov. 7, 1950     T. I. WIPER ET AL     2,528,631
POTATO TOP PULLER

Filed May 31, 1949     2 Sheets-Sheet 1

INVENTORS.
THOMAS I. WIPER
ARNOLD WIPER
GERALD R. TRUSKEY
BY Smart & Biggar
Attys.

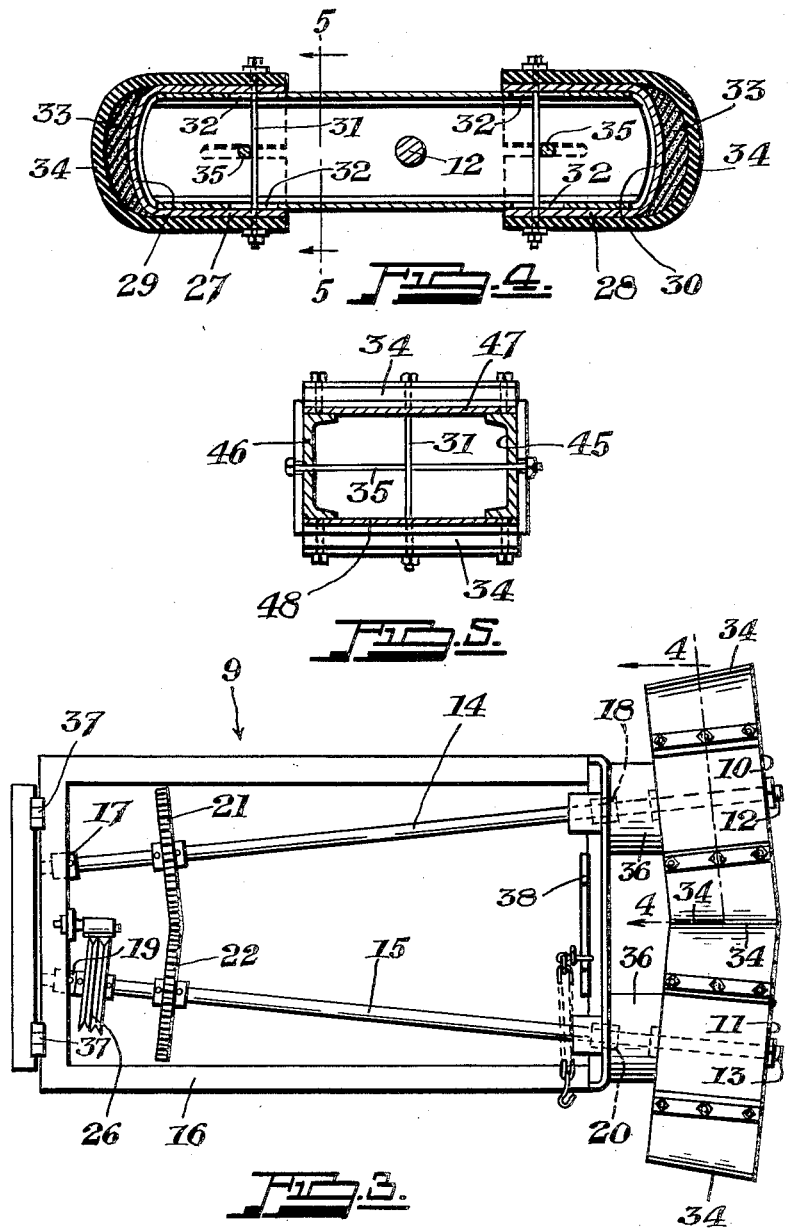

Patented Nov. 7, 1950

2,528,631

UNITED STATES PATENT OFFICE 2,528,631

POTATO TOP PULLER

Thomas Isaac Wiper, Arnold Wiper, and Gerald Robert Truskey, Leamington, Ontario, Canada Application May 31, 1949, Serial No. 96,166

3 Claims. (Cl. 55—66)

This invention relates to a puller for pulling the tops of potatoes and the like.

Potato and the like top pullers with rotating top-pulling elements which coact together to pull the tops off potato plants have been provided in the past. Such rotating elements have been drum-like in character or at least substantially so. While the top pullers of the prior art have been used to some extent, the great disadvantage of them is that they also pull the potatoes from the ground as they remove the tops. This usually results in bruising or damaging of the potato crop. My invention overcomes these disadvantages.

It is an object of the present invention to provide a device for pulling potato tops which will remove the tops without lifting the potatoes from the ground.

It is a further object of the invention to provide a device for pulling potato tops which is simple and cheap to manufacture.

It is a still further object of the invention to provide a potato top puller having the above characteristics that is rugged in construction.

With these and other objects in view, a top puller according to my invention comprises a frame, at least two pulling arms rotatably mounted on drive shafts mounted in the frame and having coacting ends, and drive means for rotating the arms in opposite directions to cause the end of one pulling arm to coact with the end of another pulling arm to remove the tops from the potato plants.

The frame is adapted to be mounted on the underneath side of an ordinary farm tractor. The rear end of the frame has a hinged portion thereon adapted to be connected to the tractor draw-bar while at the forward end of the frame a bracket is provided for coupling the front end of the puller to the tractor by means of a chain or other suitable device.

Mounted within the frame are two driving shafts which are placed in bearings on the rear end of the frame and have their forward ends projecting through bearings in the front of the frame. On the forward end of each shaft a dust collar and a puller element are mounted, the puller element being fixedly secured to the shaft so that it will revolve therewith. The shafts diverge from rear to front and each has thereon a gear each of which intermeshes with the other for driving the shafts and thus the puller elements in opposite directions. On the rearward end of one shaft is a driving pulley which is adapted to be driven by suitable means from the power take-off of the tractor.

The pulling elements are each concentrically mounted on a drive shaft. They are more or less rectangular in shape and have their ends rounded. To make them resilient, a piece of sponge rubber or the like is placed over each end and over that end covering a portion of the flat upper and lower surface of the element near each end is placed a tough, fibrous material such as the type of material used in the manufacture of belting and the like.

Leather of course could be used, or any other similar material, the choice depending upon economic considerations. The fibrous material is held in position by means of suitable bolts, the position of which can be changed by moving them in one direction or the other, in a slot provided, so that the coverings can be tightened or slackened, as is desired for their conditions of use.

In the drawings:

Figure 3 is a detailed plan view of a potato top puller according to the present invention.

Figure 4 is a longitudinal sectional view on an enlarged scale through one of the rotating pulling elements taken along the line 4—4 of Fig. 3.

Figure 5 is a cross sectional view on the line 5—5 of Fig. 4 on a still further enlarged scale through one of the rotating pulling elements.

Figure 1:
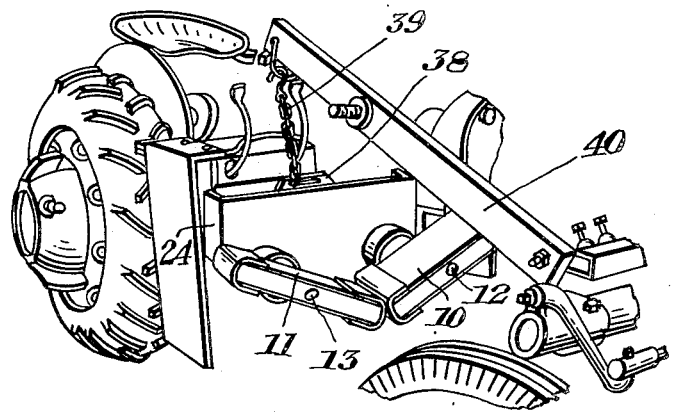
Figure 1 is a partly broken away view of a tractor showing the manner in which the front end of a top puller according to the present invention is mounted thereon.

Referring to the drawings, the reference numeral 9 designates the potato top puller according to the present invention. The pulling elements 10 and 11 are fixedly mounted intermediate their ends as at 12 and 13 on the free ends of shafts 14 and 15 respectively. The shafts 14 and 15 are in turn rotatably mounted in suitable bearings within the frame 16 as at 17 and 18, and 19 and 20 respectively. The frame 16 can be made from any suitable material such as channel iron.

Intermeshing drive gears 21 and 22 are carried by the shafts 14 and 15 respectively and rotational power is transmitted to them from the power take-off 23 of a tractor 24 through the V belt 25 and pulley 26 to cause the ends of the pulling elements 10 and 11 to coact with each other.

Figures 4 and 5 are longitudinal sectional and cross-sectional views respectively of the pulling elements 10 or 11. Each pulling element is made from two pieces 45, 46 of channel iron having top and bottom sheet metal plates 47, 48 secured thereto. Each element extends on each side of its point of connection 12 with its shaft, to form arms 27 and 28, each of which is provided with a rounded end section 29 and 30 respectively placed over the outer ends of the main section. A bolt 31 passes through each end section and through a longitudinally extending slot 32 formed in the main section of each arm to rigidly secure the end section to the main section of the arm. Adjustment of the position of the end sections 29 and 30 can be effected by loosening the bolts and moving them in the slots.

In the embodiment of the invention shown the end of each section 29 and 30 carries a sponge rubber or the like pad 33 with a belt rubber cover 34 to make it resilient and is held in position by the through bolt 31.

Drums 36 are carried by the frame 16 and surround the shafts 14 and 15 to prevent the potato tops from becoming tangled with the shafts.

Figure 2:
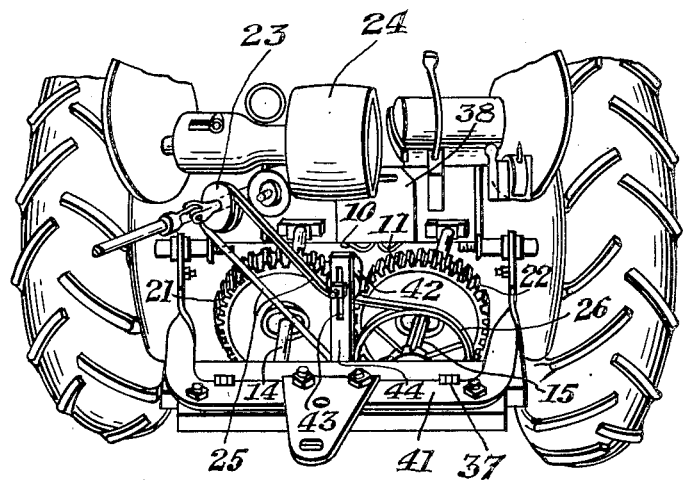
Figure 2 is a rear view of a tractor showing the manner in which the back end of a puller according to the invention is mounted thereon.

The top puller shown is designed to be mounted on a conventional tractor and to this end has a hinge 37 at its rear end for connection to the drawbar of a tractor, and a bracket 38 at its front end for suspension from the under side of a tractor. Figure 1 shows one manner of connecting the front end. The bracket 38 is suspended by means of the chain 39 from a bar 40 which is rigidly mounted on the tractor 24. In Figure 2 the manner of connecting the hinge 37 to the drawbar 41 is shown. The inclination of the puller can be adjusted by adjusting the length of the chain 39.

In use, the pulley 26 of the drive means is connected to the power take-off 23 of the tractor 24 through the V belt 25. A jockey pulley 42 is provided which can be adjusted within the slot 43 of the post 44 to obtain the required tension on the belt 25. The pulley 26 is caused to rotate in the direction required to drive the rotatably mounted shafts 14 and 15 through the intermeshing gears 21 and 22, in opposite directions so that the ends of the arms 27 and 28 on the two pulling elements 10 and 11 coact as they travel in an upward direction to nip therebetween and pull standing potato tops, as the tractor 24 is driven along a potato row. The clearance between the ends of coacting arms can be varied to suit crop conditions by adjusting the positions of the end portions 29 and 30. More clearance between the arms is required for a crop having a heavy top growth than for one having a light top growth.

Embodiments of the invention other than the one shown will be apparent to those skilled in the art and it is not intended that the invention should be limited by the foregoing other than by the limitations expressed in the following claims.

What we claim is:

1. A top puller comprising a frame, two shafts rotatably mounted in said frame, spaced apart pulling elements mounted intermediate their ends on each of said shafts, each of the ends of said elements being adjustable thereon and having locking means for locking the said ends in the desired position of adjustment, resilient means carried by the ends of the said elements, and drive means for rotating said shafts in a plane at right angles to the direction of movement of the puller to cause an end of one element to coact with an end of the other element when moving in an upward direction.

2. A top puller comprising a frame, two shafts rotatably mounted in said frame, a substantially rectangular spaced apart pulling element mounted intermediate its ends on each of said shafts, the said ends being resilient and adjustable on the same elements, and drive means for rotating said shafts in a plane at right angles to the direction of movement of the puller to cause an end of one element to coact with an end of the other element when moving in an upward direction.

3. A top puller comprising a frame, two spaced-apart substantially rectangular pulling elements having coacting resilient ends, adjustable mounting means for mounting the ends on each pulling element, locking means for locking the said ends in the desired position of adjustment on the said element, means for rotatably mounting each of said pulling elements in said frame at a point intermediate and transversely of its length, and drive means for rotating said shafts in opposite directions at right angles to the direction of movement of the puller to cause the resilient end of one element to coact with the resilient end of the other element when moving in an upward direction.

THOMAS ISAAC WIPER.
ARNOLD WIPER.
GERALD ROBERT TRUSKEY.

REFERENCES CITED

The following references are of record in the file of this patent:

UNITED STATES PATENTS

| Number | Name | Date |
|---|---|---|
| 249,997 | Richardsen | Nov. 22, 1881 |
| 472,234 | Smith | Apr. 5, 1892 |
| 639,618 | Russell | Dec. 19, 1899 |
| 641,577 | Buchanan | Jan. 16, 1900 |
| 1,087,309 | Lussier | Feb. 17, 1914 |
| 2,314,773 | Dahlman | Mar. 23, 1943 |